(No Model.) 5 Sheets—Sheet 1.

J. KOCH.
OIL PRESS.

No. 543,343. Patented July 23, 1895.

Witnesses.
William Schulz
John Becker

Inventor:
Julius Koch
by his attorneys
Roeter & Briesen (No Model.) 5 Sheets—Sheet 2.

J. KOCH.
OIL PRESS.

No. 543,343. Patented July 23, 1895.

(No Model.)  5 Sheets—Sheet 3.

J. KOCH.
OIL PRESS.

No. 543,343.   Patented July 23, 1895.

Witnesses:
William Schulz
John Becker

Inventor:
Julius Koch
by his attorneys
Roeder & Briesen (No Model.)  5 Sheets—Sheet 4.
J. KOCH.
OIL PRESS.
No. 543,343.  Patented July 23, 1895.
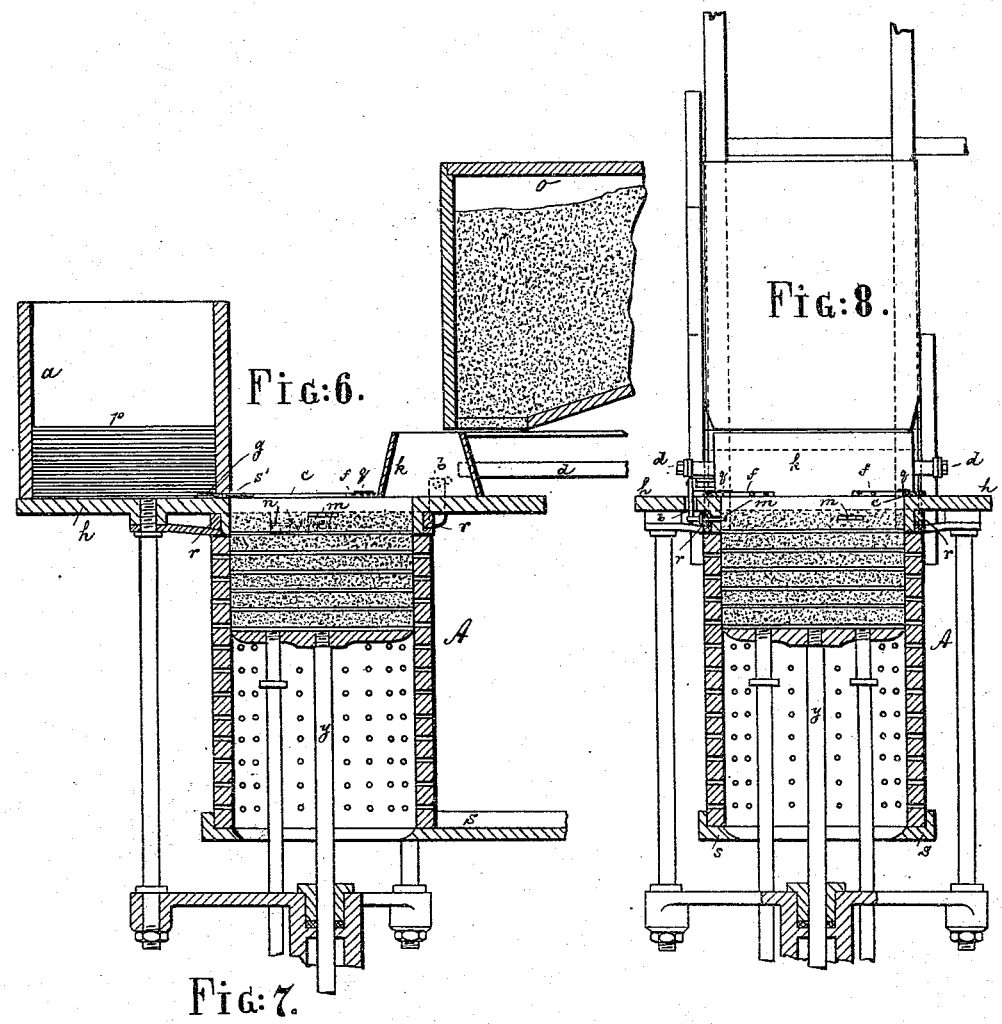
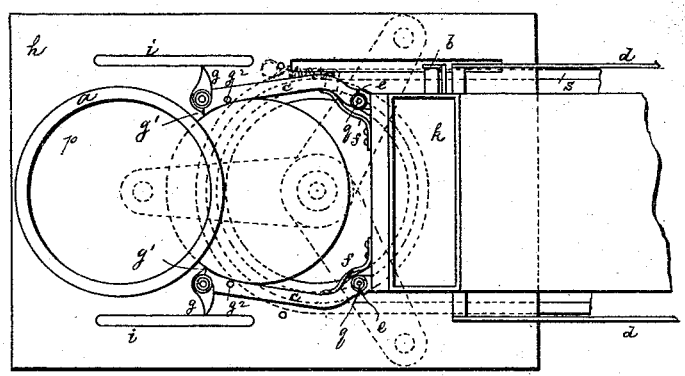
Witnesses:
William Schulz
John Becker
Inventor:
Julius Koch
by his attorneys
Roeder & Briesen (No Model.) 5 Sheets—Sheet 5.

J. KOCH.
OIL PRESS.

No. 543,343. Patented July 23, 1895.

Witnesses:
William Schulz
John Becker

Inventor:
Julius Koch
by his attorneys
Roester & Brieser

UNITED STATES PATENT OFFICE.

JULIUS KOCH, OF MÜNDEN, GERMANY.

OIL-PRESS.

SPECIFICATION forming part of Letters Patent No. 543,343, dated July 23, 1895.

Application filed July 7, 1894. Serial No. 516,852. (No model.)

*To all whom it may concern:*

Be it known that I, JULIUS KOCH, a subject of the German Emperor, residing at Münden, Germany, have invented certain new and useful Improvements in Oil-Presses, of which the following is a specification.

This invention relates to an improved oil-press, in which the oil-seed is divided by a series of press-plates, which are automatically introduced into the straining-vessel, so that alternate layers of oil-seed and press-plates are formed.

Figure 1:
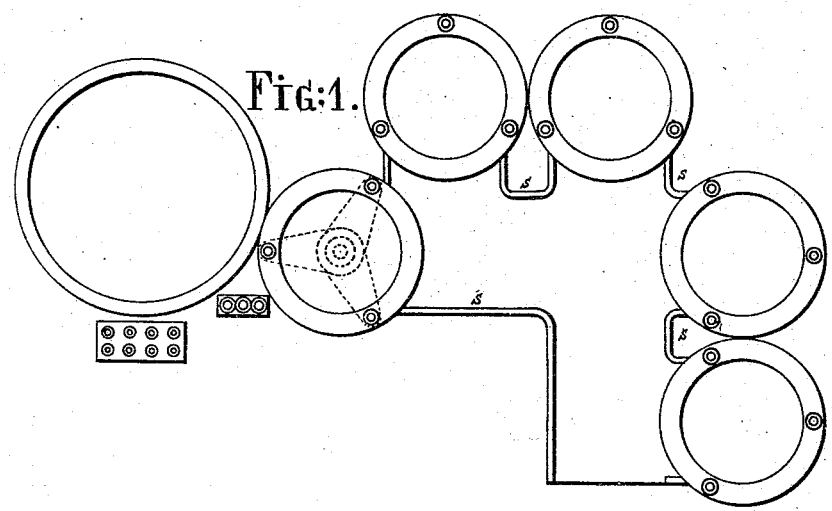
Figure 9:
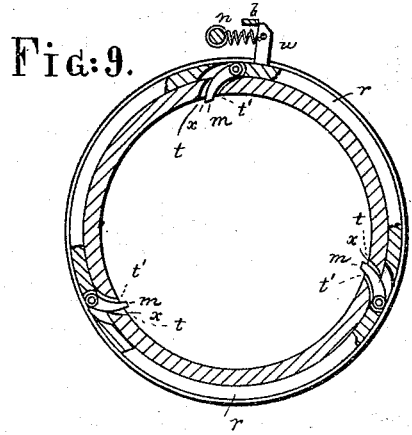
Figure 10:
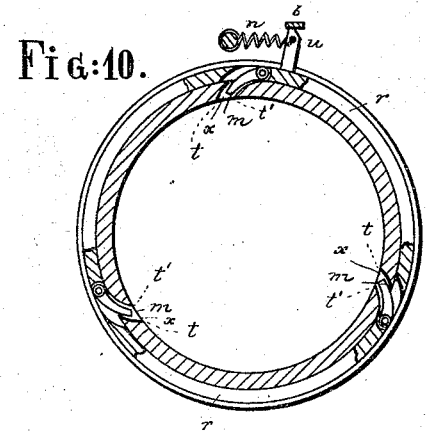
Figure 2:
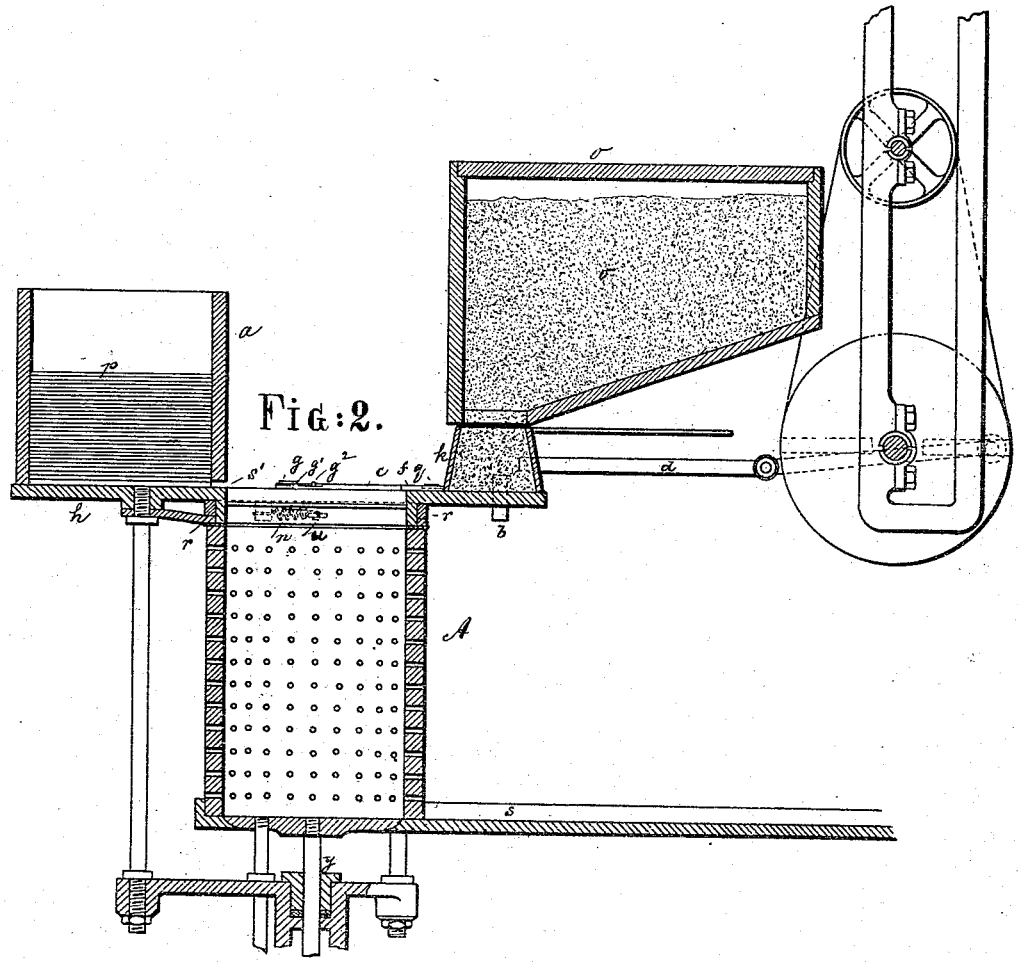
Figure 3:
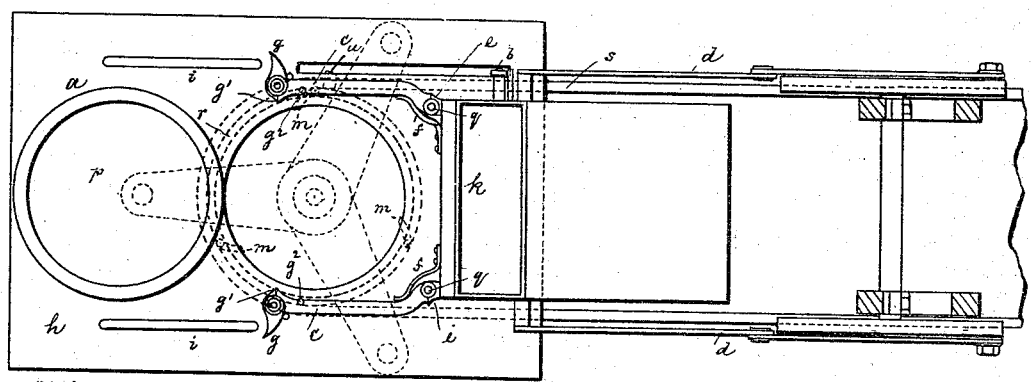
Figure 4:
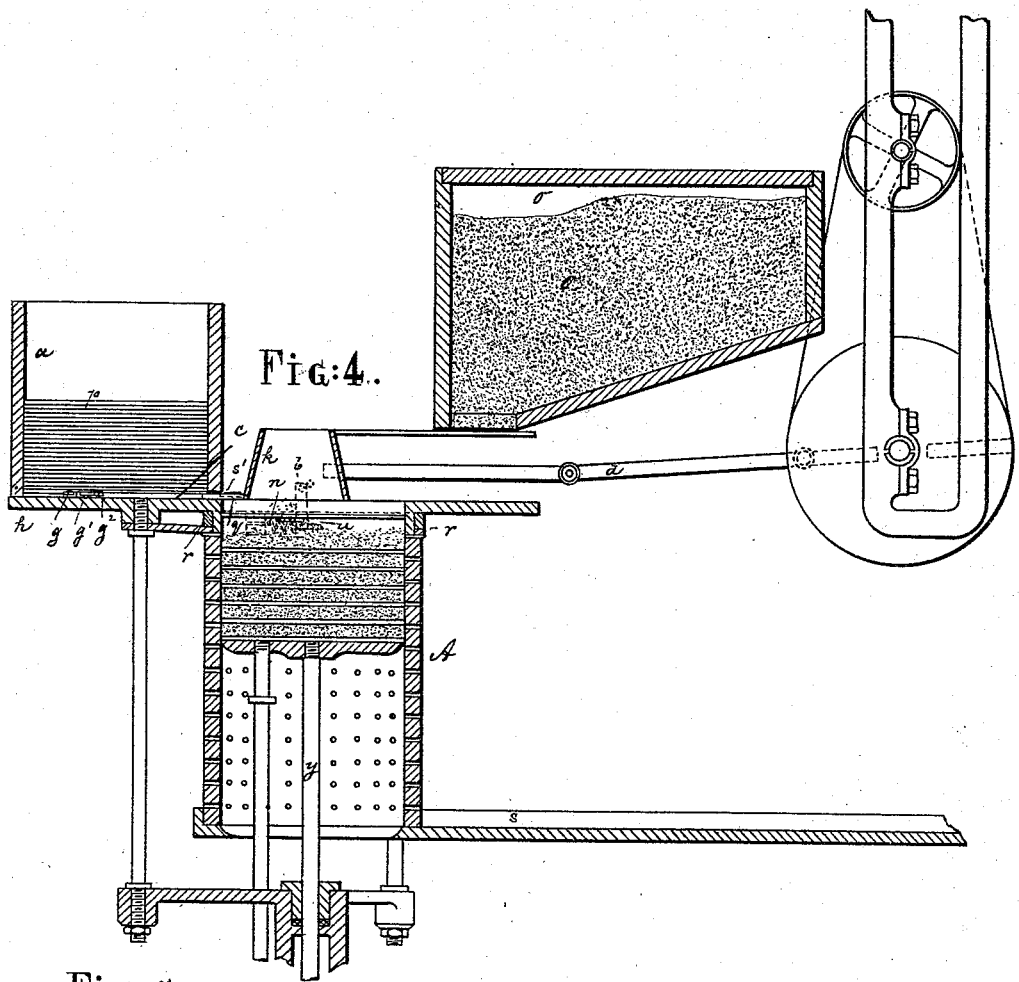
Figure 5:
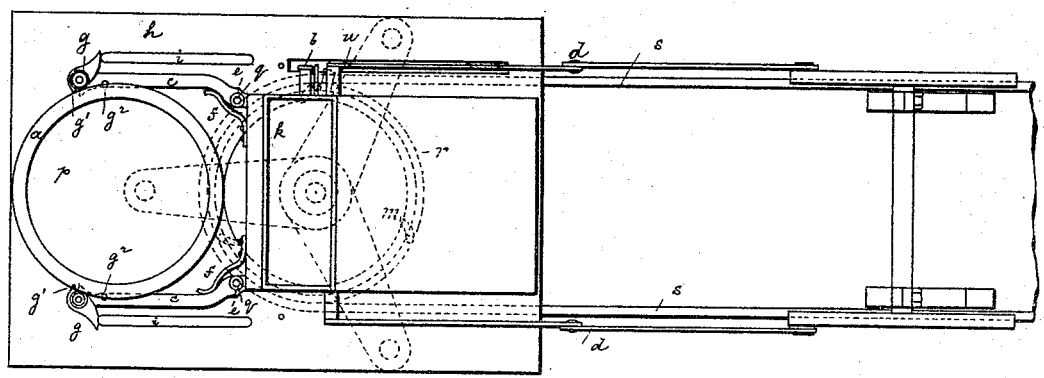
Figure 11:
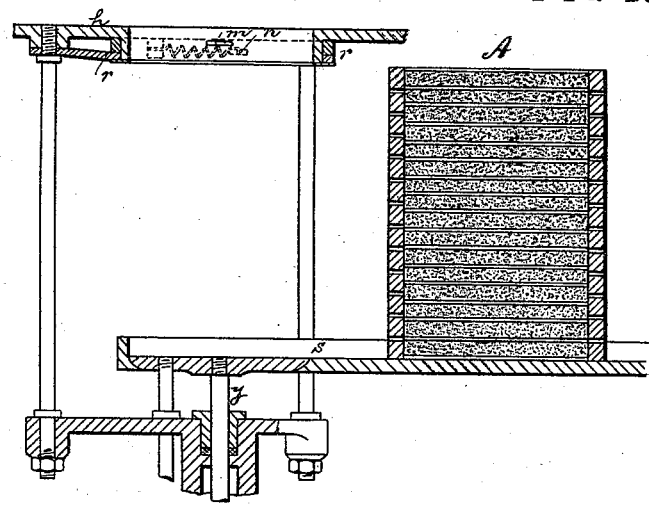
Figure 12:
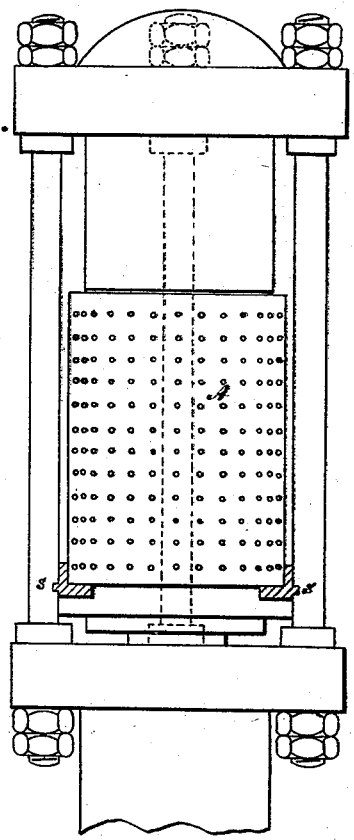
Figure 13:
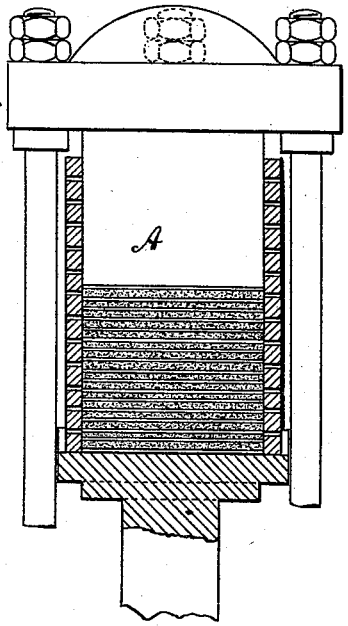

In the accompanying drawings, Figure 1 is a plan of the plant. Figs. 2, 4, and 6 are vertical sections of the oil-press, showing the parts in different positions. Figs. 3, 5, and 7 are plans of Figs. 2, 4, and 6, respectively. Fig. 8 is a section through the straining-vessel. Figs. 9 and 10 are cross-sections of Fig.
8. Figs. 11, 12, and 13 are detail vertical sections and an elevation of the straining-vessel.

The letter A represents the straining-vessel, adapted to be moved along rails $s$, which form a track between the feed-vessel and the press apparatus. The oil-cakes are separated within the straining-vessel by plates $p$, which are automatically introduced after one another and are covered with the desired quantity of oil-seed, after which they are released to fall upon a descending piston.

The plates $p$ are stored within a receptacle $a$, which is arranged above the straining-vessel. This receptacle is mounted upon a table $h$, upon which the oil-seed box $k$ and the arms $c$, which are connected thereto, may be reciprocated by crank-rods $d$. The receptacle $a$ is provided with a slit $s'$ above its bottom and opposite to the straining-vessel A, so that one plate may be slid outward at a time. The withdrawal of the plates is effected by the arms $c$, turning on pivots $q$ and adapted to be thrown outward against stops $e$ by springs $f$. During the forward motion the arms $c$ clear the plates $p$, while during the backward motion they are pressed against the lowermost plate and encircle the same with their curved ends. These ends are provided with the pawls $g$, which come into contact with guide-rails $i$ during the forward and also during the backward motion, and which are thus revolved as far as stops $g'$ $g^2$ will permit. During the forward motion the pawls will assume the position shown in Fig. 5, and the arms will be spread by their springs $f$, so as to clear the plates $p$; but during the backward motion the pawls will strike the front ends of the rails $i$ and will assume the position shown in Fig. 7, so that the arms $c$ will be moved toward each other and will engage the lowermost plate $p$.
In this way such plate will be taken along until it arrives over the straining-vessel, when it will be released, because the pawls $g$ will now clear the rails $i$ and the arms $c$ will be spread by the springs $f$. The plate $p$ will now fall through an opening of the table $h$ and upon the fingers $m$ of the straining-vessel. The feed-box $k$ will next arrive beneath the oil-seed tank (heater) $o$ to be filled. It is then by crank-rod $d$ moved to a position above the opening of the table $h$ to permit the oil-seed to drop into the straining-vessel. In order to spread the seed uniformly upon the plate $p$ the box $k$ is moved across the entire opening of the table before it recedes. The fingers $m$, upon which the plates $p$ rest, are movably secured to a ring $r$ and reach into the interior of the straining-vessel through slits $x$. The ring $r$ is retained by spring $n$ in the position shown in Fig. 9, in which the fingers $m$ strike against the edge $t$ of opening $x$ and are thus moved inward. During the backward motion of the oil-box $k$ and arms $c$ a stop $b$, depending from box $k$, will strike against a lever $u$ to revolve ring $r$, and to thus cause the fingers $m$ to strike against the edge $t'$ of opening $x$. Thus the fingers will be withdrawn and the first plate $p$ will be free to drop upon the piston $y$. The piston $y$ is moved slowly downward, the motion being imparted either separately or in connection with the slide-box.

After the straining-vessel is filled in the manner described, it is placed into a press and the piston, upon which the seed-cakes have previously descended, will rise, so that the pressed residue as well as the plates may be separately removed at the top.

In lieu of storing the plates $p$ in a receptacle above the table they may be stored in a receptacle below the table, in which case they are raised by mechanical or hydraulic means, so that one plate is elevated at a time, drawn toward the straining-vessel by the arms $c$ and placed upon the fingers $m$ in the manner already described.

What I claim is—

1. The combination of a straining vessel A, with a reciprocating feed box $k$, arms $c$, having pawls $g$, plate storing receptacle $a$, rails $i$, adapted to engage the pawls, and means for operating the arms $c$ substantially as specified.

2. The combination of a straining vessel with a ring $r$, above the same fingers $m$, pivoted thereto, and with a reciprocating feed box having a stop that is adapted to engage said ring and actuate the same, substantially as specified.

3. The combination in an oil press, of a straining vessel, having a series of movable fingers or supports for the press plates, with a sliding feed box, arms for drawing the press plates into alignment with the straining vessel, and means for operating said arms substantially as specified.

In testimony whereof I have signed this specification in the presence of two subscribing witnesses.

JULIUS KOCH.

Witnesses:
PAUL MADDONG,
FERD HEUPEL.